US009112555B2

(12) United States Patent
Silverman et al.

(10) Patent No.: US 9,112,555 B2
(45) Date of Patent: Aug. 18, 2015

(54) TRANSMIT CORRELATED ARRAY GAIN REDUCTION

(71) Applicant: Cisco Technology, Inc., San Jose, CA (US)

(72) Inventors: Matthew A. Silverman, Shaker Heights, OH (US); Paul J. Stager, Akron, OH (US); James C. Nicholson, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 13/678,849

(22) Filed: Nov. 16, 2012

(65) Prior Publication Data

US 2014/0140438 A1 May 22, 2014

(51) Int. Cl.
*H04L 27/00* (2006.01)
*H04B 7/04* (2006.01)
*H04B 7/06* (2006.01)
*H04W 52/42* (2009.01)

(52) U.S. Cl.
CPC ............ *H04B 7/0426* (2013.01); *H04B 7/0602* (2013.01); *H04W 52/42* (2013.01)

(58) Field of Classification Search
CPC .... H04B 7/0426; H04B 7/0602; H04W 52/42
USPC .......................................................... 375/299
See application file for complete search history.

(56) References Cited

U.S. PATENT DOCUMENTS

| 2008/0043867 | A1* | 2/2008 | Blanz et al. ................... 375/260 |
| 2008/0090529 | A1 | 4/2008 | Smith |
| 2008/0165883 | A1* | 7/2008 | Jiang et al. ..................... 375/267 |
| 2009/0161784 | A1* | 6/2009 | Stadelmeier et al. ......... 375/267 |
| 2010/0150129 | A1 | 6/2010 | Jin et al. |
| 2011/0177838 | A1* | 7/2011 | Olszewski ..................... 455/522 |
| 2012/0120881 | A1* | 5/2012 | Kalhan ......................... 370/329 |
| 2012/0320869 | A1* | 12/2012 | Stadelmeier et al. ......... 370/329 |
| 2013/0260814 | A1* | 10/2013 | Bergman et al. ............... 455/522 |

\* cited by examiner

*Primary Examiner* — Erin File
(74) *Attorney, Agent, or Firm* — Edell, Shapiro & Finnan, LLC (57) ABSTRACT

Techniques are presented herein to achieve reduced array gain associated with a transmission made from multiple antennas of a wireless communication device. In accordance with one technique, a wireless communication device is provided having a plurality of transmitters each configured to transmit via a corresponding one of a plurality of antennas. Subcarriers of at least one transmit signal to be weighted across the plurality of transmitters are allocated power so that for each subcarrier, only one transmitter is allocated a maximum power.

18 Claims, 5 Drawing Sheets

TRANSMIT CORRELATED ARRAY GAIN REDUCTION

TECHNICAL FIELD

The present disclosure relates to wireless communication devices.

BACKGROUND

New regulatory rules focus on correlation between signals transmitted from different antennas of a wireless communication device that can lead to array gain (intentional or unintentional), which increases the directional gain of the wireless communication device and leads to higher radiation levels in some directions. This contribution of antenna array gain to the directional gain of the transmitter is considered in all measurement situations where conducted measurements are combined with directional antenna gain to determine compliance with in-band regulatory limits. Signals can be correlated anytime the same signal (or space-time stream) is transmitted across two or more antennas in a given symbol period even with different phase shifts and time delays.

DESCRIPTION OF EXAMPLE EMBODIMENTS

Overview

Techniques are presented herein to achieve reduced array gain associated with a transmission made from multiple antennas of a wireless communication device. In accordance with one technique, a wireless communication device is provided having a plurality of transmitters each configured to transmit via a corresponding one of a plurality of antennas. Subcarriers of at least one transmit signal to be weighted across the plurality of transmitters are allocated power so that for each subcarrier, only one transmitter is allocated a maximum power.

In accordance with another technique, orthogonal precoding vectors are applied to adjacent subcarriers of at least one transmit signal to weight the at least one transmit signal across the plurality of transmitters for transmission.

In accordance with yet another technique, at least one transmit signal comprising a plurality of subcarriers is duplicated to form a duplicated transmit signal. Orthogonal precoding vectors are applied to the same (corresponding) subcarriers of the transmit signal and duplicated transmit signal to weight the at least one transmit signal and the duplicated transmit signal across the plurality of transmitters for transmission.

According to yet another technique, in a wireless communication device having a plurality of transmitters each configured to transmit via a corresponding one of a plurality of antennas, beamforming weights are applied to a transmit signal comprised of a plurality of subcarriers to beamform the transmit signal across the plurality of antennas and such that for each subcarrier, the transmit signal is transmitted via less than the number of the plurality of transmitters.

Example Embodiments

Most wireless communication devices are subject to emission/radiation regulations that place requirements on radiation levels in any given direction with respect to the device. This becomes even more challenging for a wireless communication device that has multiple antennas and an associated transmitter for each antenna, a configuration useful in a multiple-input multiple-output (MIMO) wireless communication system, such as that used in an IEEE 802.11 wireless local area network (WLAN).

When a transmission is simultaneously made from multiple antennas, there is a possibility that the radiation at a certain direction from the wireless device may violate regulatory levels due to directional gain from the beamformed transmission from multiple antennas. This problem exists for any wireless transmitter that uses more than one transmitter (and more than one antenna) for sending a transmission, and becomes more severe as the number of transmit chains increase, which will be the trend for future wireless communication device platforms.

The radiation violation problem is primarily an issue when transmitting a single signal (spatial) stream because the theoretical array gain is reduced as the number of transmitted spatial streams increases. However, there is power backoff due to array gain on two spatial streams as well, and therefore, the methods presented herein can be extended to and used when transmitting more than one spatial stream, as will become apparent from the following description.

Three methods are presented herein to address the transmit power reduction imposed by regulatory requirements due to antenna array gain, by taking advantage of all the transmitter chains in the wireless device, e.g., an access point (AP) device, while minimizing the array gain. The first method is universally effective at reducing the array gain to 0 dB per subcarrier, while the second and third methods are effective to reduce array gain down to max(0, 10*log 10(nTx/3)), where nTx is the number of transmitters of the wireless device.

Figure 1:
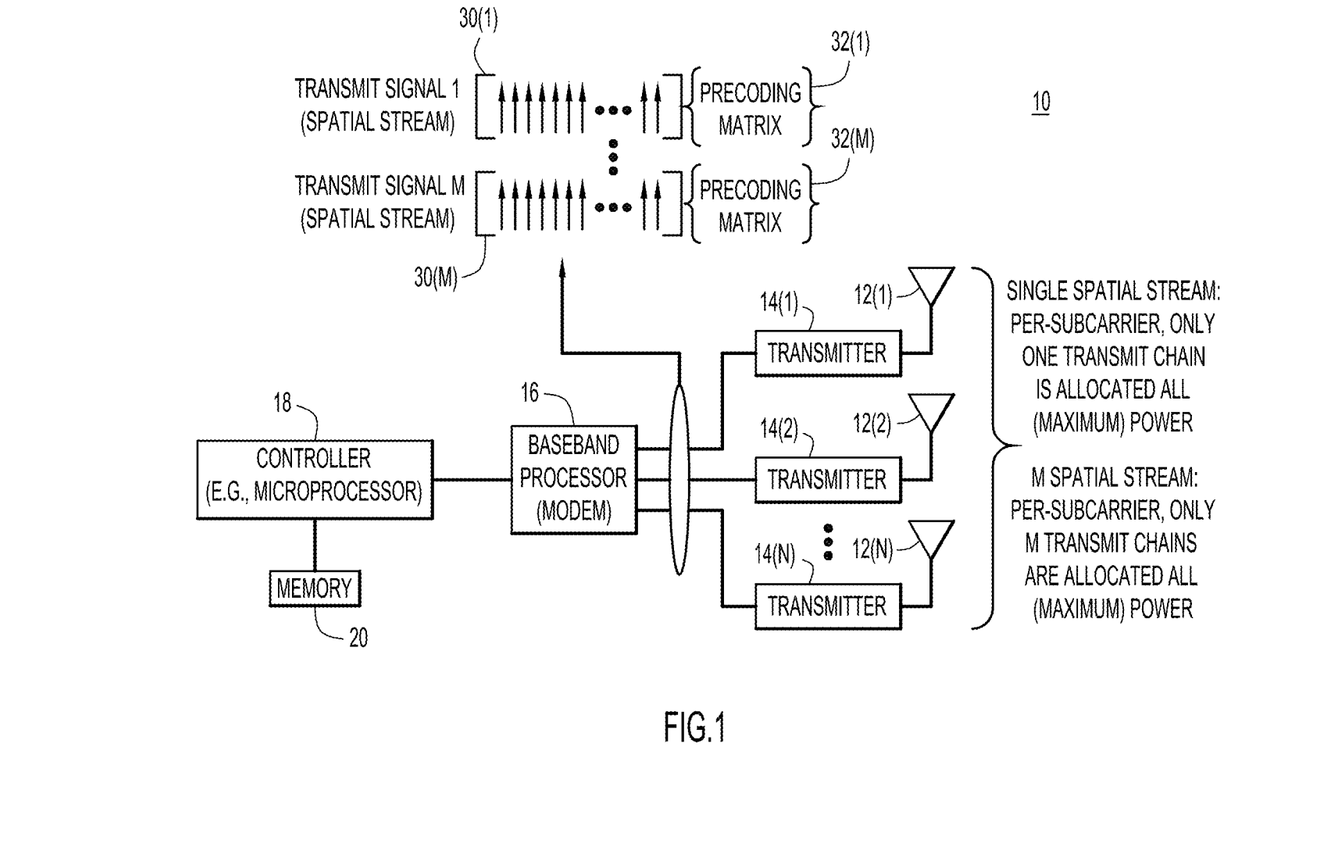
FIG. 1 is a block diagram of a wireless communication device configured to perform array gain reduction techniques presented herein.

Reference is first made to FIG. 1 for a description of a wireless communication device, e.g., an AP, configured to perform the array gain reduction techniques presented herein. The wireless device is generally shown at reference numeral 10, and comprises a plurality of antennas 12(1)-12(N), a corresponding plurality of transmitters 14(1)-14(N), a baseband processor (e.g., modem) 16, a controller (e.g., microprocessor) 18 and memory 20. For simplicity, only the transmit chains/paths are shown for the wireless device 10 but it should be understood that there are also receivers associated with one or more of the antennas 12(1)-12(N) to receive signals transmitted by another device, e.g., a client device (or in IEEE 802.11 parlance, a station).

As shown in FIG. 1, each antenna is coupled to a corresponding transmitter. For example, antenna 12(1) is connected to transmitter 14(1), antenna 12(2) is connected to transmitter 14(2) and so on. The baseband processor 16 generates antenna-specific baseband signals that are supplied to respective ones of the transmitters 14(1)-14(N) for transmission via a corresponding one of the antennas 12(1)-12(N). The baseband processor 16 is configured to perform various baseband signal processing operations, such as beamforming/precoding of one or more transmit signal streams (spatial streams) sourced from the controller 18, to generate the antenna-specific baseband signals.

The baseband processor 16 may be implemented by digital logic gates in one or more integrated circuits, e.g., one or more Application Specific Integrated Circuits (ASICs), or by software stored in memory and executed by a processor, e.g., the controller 18 or another processor.

The controller 18 performs overall control of the client device 30. The controller 18 may be a microprocessor or microcontroller that executes instructions stored/encoded in memory 20. The operations of the wireless device 10 in generating the antenna-specific baseband signals described herein may be performed by the baseband processor 16 or the controller 18.

Memory 20 may comprise read only memory (ROM), random access memory (RAM), magnetic disk storage media devices, optical storage media devices, flash memory devices, electrical, optical, or other physical/tangible memory storage devices. In general, the memory 20 may comprise one or more tangible (non-transitory) computer readable storage media (e.g., a memory device) encoded with software comprising computer executable instructions and when the software is executed (by the control processor 18) it is operable to perform the operations described herein.

FIG. 1 shows that one or more signal streams (spatial streams) 30(1)-30(M), sourced from the controller 18 for example, are weighted by a corresponding precoding matrix 32(1)-32(M) for generating the antenna-specific baseband signals that are coupled to the transmitters 14(1)-14(N). Each spatial stream 30(1)-30(M) comprises a plurality of subcarriers according to an Orthogonal Frequency Division Multiplexing (OFDM) modulation scheme.

As will become more apparent from the following description, these techniques allow for the use of all power amplifiers in the transmitters 14(1)-14(N), so that each is operating within the error vector magnitude (EVM) limits while providing a combined total power much higher than a single power amplifier (in a single transmitter) could deliver.

Method 1

FIG. 1 further shows that, according to a first method described herein, for a single spatial stream (e.g., M=1), only one transmit chain is allocated all (maximum) power per subcarrier, and for M=>2 spatial streams, only M transmit chains are allocated all (maximum) power per subcarrier. The transmit chain that is allocated power is rotated such that the power allocated to each transmit chain is balanced overall. This could be done by dividing the full bandwidth of subcarriers into swathes/groups allocated to each transmit chain or by changing transmit chain every subcarrier. The result is that no beamforming occurs per subcarrier, but power is still distributed across all of the transmit chains.

Figure 2:
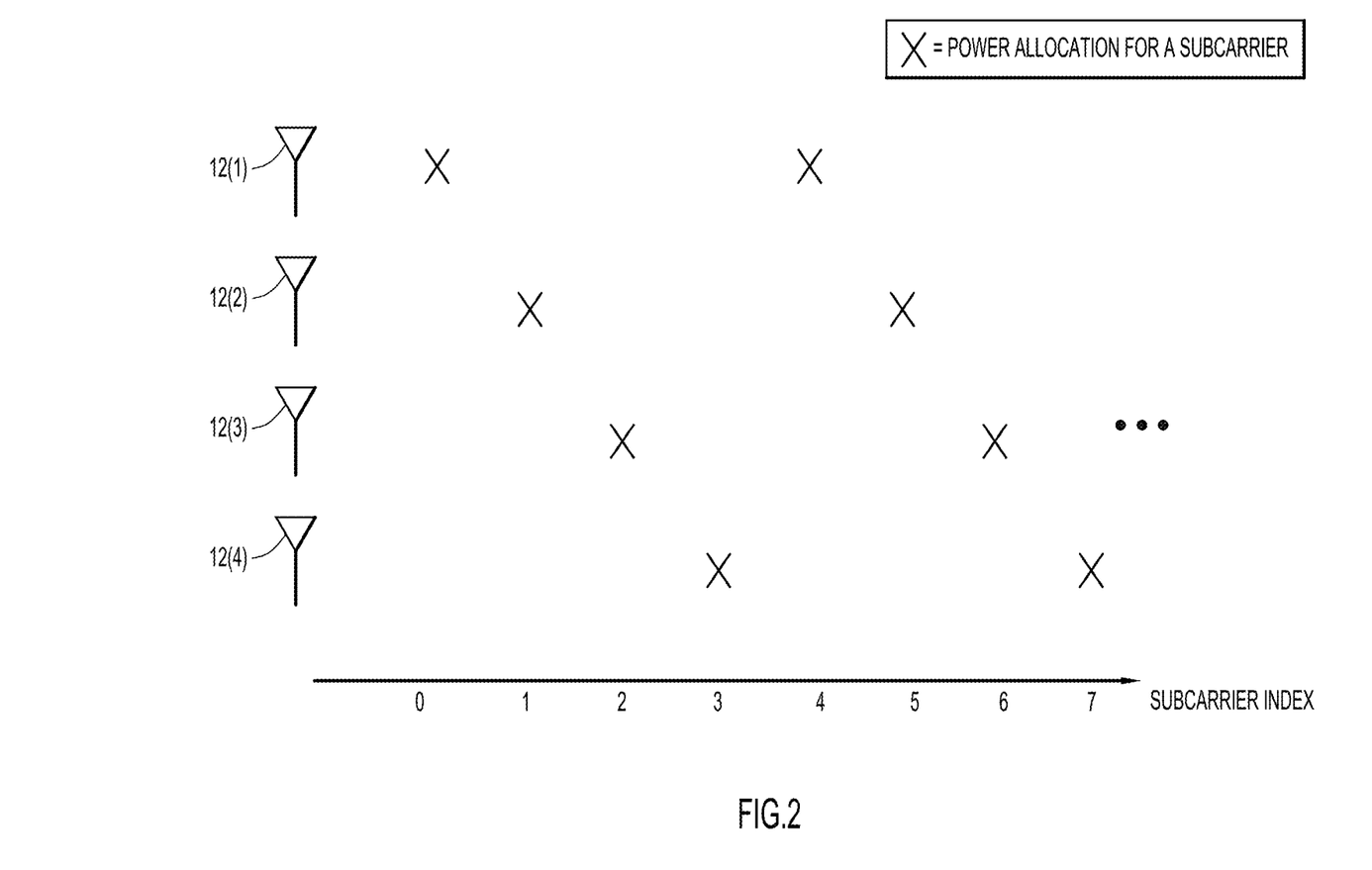
FIG. 2 is a diagram graphically illustrating a first technique for array gain reduction.

Reference is now made to FIG. 2 for a graphical depiction of Method 1 in the case in which there are four transmit chains (e.g., 4 transmitters and 4 antennas). The four antennas are shown at 12(1)-12(4) in FIG. 2. In the example of FIG. 2, the precoding matrix applied to the subcarriers of a spatial stream causes power for contiguous subcarriers to be rotated through the transmit chains. For example, power for subcarrier "0" is allocated to the transmit chain for antenna 12(1), power for subcarrier "1" is allocated to the transmit chain for antenna 12(2), power for subcarrier "2" is allocated to the transmit chain for antenna 12(3) and power for subcarrier "3" is allocated to the transmit chain for antenna 12(4). This sequence repeats for the next four subcarriers. That is, power for subcarrier "4" is allocated to transmit chain for antenna 12(1), and so on, as shown in FIG. 2.

For the example of four transmit chains, the precoding matrix $V\_k$ for subcarrier k can be expressed as (for any arbitrary four contiguous subcarriers, where $^T$ is the transpose operation/operator—a short-hand way to indicate that the quantity is a vector):

$V\_1 = [1\ 0\ 0\ 0]^T$
$V\_2 = [0\ 1\ 0\ 0]^T$
$V\_3 = [0\ 0\ 1\ 0]^T$
$V\_4 = [0\ 0\ 0\ 1]^T$

Another way to implement the precoding to allocate power for subcarriers of a spatial stream is to assign/divide subcarriers to swathes (groups) of four subcarriers and apply a precoding as follows, e.g.:

$V\_(1:numSc/4) = [1\ 0\ 0\ 0]^T$
$V\_(numSc/4+1:2*numSc/4) = [0\ 1\ 0\ 0]^T$
$V\_(2*numSc/4+1:3*numSc/4) = [0\ 0\ 1\ 0]^T$
$V\_(3*numSc/4+1:numSc) = [0\ 0\ 0\ 1]^T$ where numSc is the total number of subcarriers of the spatial stream. In other words, the subcarriers of the transmit signal are divided into groups, and power for groups of subcarriers is allocated to a corresponding one of the plurality of transmitters.

For multiple spatial streams, the precoding according to Method 1 involves rotating (nSS) transmitters per subcarrier, where nSS is the number of spatial streams (=>2). For example, for 2 spatial streams, the precoding matrices are:

$V\_1 = [[1\ 1\ 0\ 0]^T [1\ -1\ 0\ 0]^T]$
$V\_2 = [[0\ 0\ 1\ 1]^T [0\ 0\ 1\ -1]^T]$

In other words, power is allocated to subcarriers of M plurality of transmit signals for simultaneous transmission by a plurality of transmitters, so that for each subcarrier, only M transmitters are allocated maximum power.

A limitation for the multiple spatial stream scenario is that on all antennas, nTx*nSS<numSc, where nTx is the number of transmitters, nSS is the number of spatial streams and numSc is the number of subcarriers in each spatial stream. In cases where nTx*nSS does not perfectly divide into numSc, power will not be perfectly balanced, but can be made to be very close to balanced for most cases.

Figure 3:
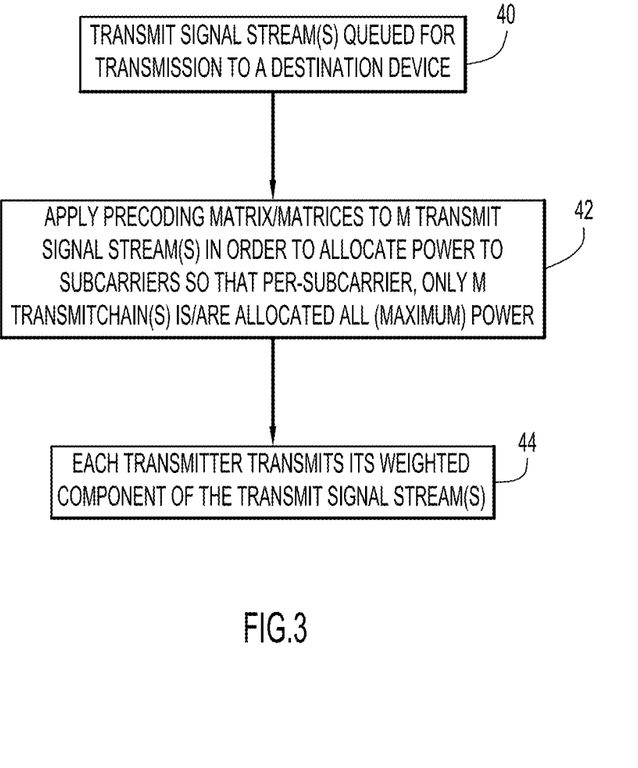
FIG. 3 is a flow chart depicting operations of the first technique for array gain reduction.

Turning now to FIG. 3, a flow chart is shown for operations that are performed in the wireless device 10 for Method 1. At 40, one or more transmit signal streams is/are queued for transmission to a destination device. At 42, one or more precoding matrices are applied to M signal streams in order to allocate power to subcarriers of each signal stream so that per-subcarrier, only M transmit chain(s) is/are allocated all (maximum) power. In other words, power is allocated to subcarriers of at least one transmit signal (stream) to be weighted across a plurality of transmitters for transmission so that for each subcarrier, only one transmitter is allocated maximum power. As a result, no beamforming occurs per subcarrier. At 44, each transmitter transmits its weighted component of the transmit signal stream(s).

Method 2

A regulatory scheme may focus on power spectral density (PSD) in a 1 MHz bandwidth that includes/corresponds to approximately 3 subcarriers worth of bandwidth of a signal, in the case of an IEEE 802.11 OFDM system. For adjacent subcarriers, orthogonal precoding vectors that have been corrected for small changes in frequency may be used to produce a beam pattern that is very close to that of the single transmitter case depending on the number of antennas. When the number of transmitters is greater than or equal to 3, the array gain can be reduced to ~0 dB for a 1 MHz bandwidth.

For example, in the case of four transmitters, the following precoding vectors for three contiguous subcarriers of bandwidth of a signal stream would be:

$[1\ 1\ 1\ 1]^T$ for subcarrier 1
$[1\ -1\ -1\ 1]^T$ for subcarrier 2
$[1\ 1\ -1\ -1]^T$ for subcarrier 3

Thus, the precoding vector for subcarrier 2 is orthogonal to the precoding vector for subcarrier 1. Moreover, the precoding vector for subcarrier 3 is orthogonal to the precoding vector for subcarrier 2 and orthogonal to the precoding vector for subcarrier 1. Said another way, for a group of three contiguous subcarriers, a first precoding vector is applied to a first subcarrier; a second precoding vector is applied to a second subcarrier, wherein the second precoding vector is orthogonal to the first precoding vector; and a third precoding vector is applied to a third subcarrier, wherein the third precoding vector is orthogonal to the first precoding vector and to the second precoding vector.

The precoding technique of Method 2, while not completely eliminating the array gain, reduces it from 6 dB down to 1.3 dB. For the case of three transmitters, the array gain is reduced to 0 dB across a 1 MHz bandwidth. More generally, the array gain is reduced to 10 log 10(nTx/3), for all cases other than nTx=3 (where nTx is the number of transmitters), where the array gain reduces to 0 dB.

Figure 4:
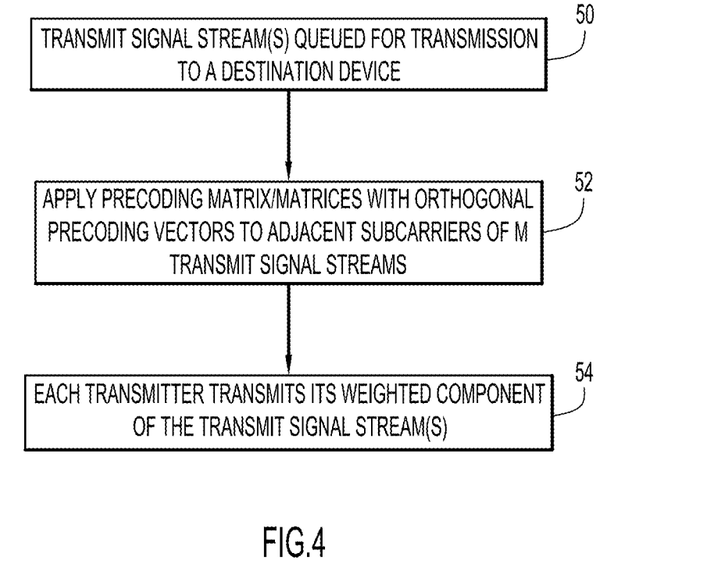
FIG. 4 is a flow chart depicting operations of a second technique for array gain reduction.

Turning now to FIG. 4, a flow chart is shown depicting the operations associated with Method 2. At 50, one or more transmit signal streams are queued for transmission to a destination device. At 52, a precoding matrix/matrices with orthogonal precoding vectors is/are applied to adjacent subcarriers of M transmit signal streams. At 54, each transmitter transmits its weighted component of the transmit signal stream(s). Thus, Method 2 involves applying to adjacent subcarriers of at least one transmit signal orthogonal precoding vectors to weight the at least one transmit signal across a plurality of transmitters for transmission.

The examples presented herein use phase-based steering, but this is not meant to be limiting.

Any data rate that is backed off purely due to the regulatory restrictions (not due to error vector magnitude EVM limitations) can be sent 4.4 dB higher using these techniques. As stated above, this will have no impact on average receive signal strength at the destination device since it is not being intentionally beamformed. In scenarios where data rate is partially backed off due to regulatory restrictions and partially backed off due to EVM limitations, reducing the array gain to 1.6 from 6 may be enough to put the transmit power for that data rate at its maximum useable power. There are other system impairments that come into play, such as power amplifier linearity. While it may be possible to deal with regulatory restrictions in order to send at the highest transmit power on one antenna, this may not be desirable if the EVM sent is too poor for the packet to be received at that data rate.

Method 3

Figure 5:
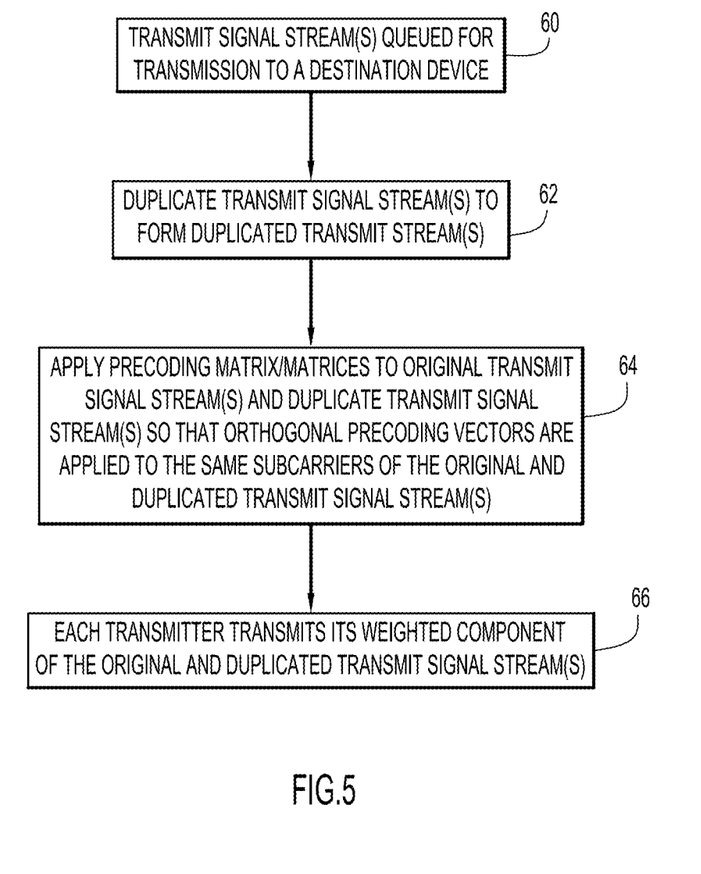
FIG. 5 is flow chart depicting operations of a third technique for array gain reduction.

A third precoding method involves a technique similar to that of Method 2, but using pseudo-streams. A pseudo-stream is a duplicate of an original stream. Turning to FIG. 5, Method 3 involves the following operations. At 60, one or more transmit signal streams are queued for transmission to a destination device. At 62, each of the one or more transmit signal streams are duplicated (replicated) to produce one or more duplicated (replicated) transmit signal streams. At 64, precoding matrix/matrices are applied to the original transmit signal stream(s) and duplicated transmit signal stream(s) so that orthogonal precoding vectors are applied to the same (corresponding) subcarriers of the original and duplicated transmit signal stream(s). At 64, each transmitter transmits its weighted component of the original and duplicated transmit signal stream(s).

Method 3 reduces the array gain to 10 log 10(nTx/nSSpseudo), where nTx is the number of transmitters and nSSpseudo is the number of duplicated spatial streams. Assuming availability of hardware capable of sending an arbitrary number of pseudo-streams, then the number of pseudo-streams can be made to be equal to the number of transmitters, which reduces the array gain to 0 dB.

One regulatory authority, the Federal Communications Commission in the U.S., defines array gain as 10 log 10(nTx/nSS). If there is more than one stream sent, the array gain decreases. Thus, as explained in connection with Method 3, one stream is mapped or duplicated into nTx streams sent with orthogonal vectors. As a result, the array gain (as defined above) can be reduced to 0 dB. Training fields can be sent in a similar way so that the packet is receivable as a single spatial stream packet by any client. This works for sending more than one stream as nTx streams also, as explained in connection with Method 2. If the number of streams does not divide evenly into nTx, power allocation can be used, or power imbalance between streams can be tolerated.

Use with Intended Beamforming

In may be useful to reduce the array gain when beamforming in order to reach a better operating point (between array gain, diversity gain, regulatory transmit power limits and client performance). For example, in an 8-transmitter AP, sending one spatial stream at maximum power would require backing off by 12 dB as compared to an AP with a single transmitter or an AP with an 8-transmitter cyclic shift delay implementation. Much of the signal-to-noise ratio (SNR) gain to a single antenna/receiver client device in an indoor environment results from diversity gains (removing channel nulls). Therefore, it may be advantageous to reduce the array gain to 3 dB by using less than the total number of transmitters e.g., 2 transmitters, per subcarrier (thereby only needing a 3 dB power backoff) and relying on the diversity gain for most of the SNR gain. For a client device that has low transmit power relative to the AP and is at a relatively long range (meaning that the channel state information estimates may be very noisy anyway), using a higher transmit power will avoid a sudden, drastic roll off in performance at range as the channel state information becomes noisy in a high array gain AP since the lower array gain is more tolerant of error due to a wider beamwidth.

A beamforming AP would operate similar to that of Method 1 for two spatial streams. Each subcarrier would have (nSS+1) transmit chains mapped. Those chains would be cycled across the entire subcarrier bandwidth in order to even out transmit power between chains (as in the non-beamforming case). This could be done by making sure that the best nSS+1 chains are chosen for each subcarrier, thereby avoiding using transmit chains with very low receive signal strength for a particular subcarrier instead of random cycling/rotating.

In summary, techniques are presented herein in which, through intelligent precoding, the beam pattern of a multiple transmit antenna wireless device can be made to the same or close to the single transmitter (antenna) case, meaning the array gain will be close to 0 dB. This allows a device to use all antennas when transmitting at single spatial stream data rates without array gain backoff imposed by a regulatory authority. The advantage over using one transmitter is that the radio front end operates at a point better suited for trading off between DC power budget and transmit EVM.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   at a wireless communication device having a plurality of transmitters each configured to transmit via a corresponding one of a plurality of antennas:
   dividing subcarriers of at least one transmit signal into groups;
   allocating power to the groups of the subcarriers of the at least one transmit signal to be weighted across the plurality of transmitters for transmission; and
   applying a precoding matrix for each subcarrier so that for each subcarrier, only one transmitter is allocated a maximum power and no beamforming occurs per subcarrier.

2. The method of claim 1, wherein for four antennas, allocating comprises applying a precoding matrix V_k for subcarrier k, where for any arbitrary four contiguous subcarriers, V_k=
   $V\_1 = [1\ 0\ 0\ 0]^T$
   $V\_2 = [0\ 1\ 0\ 0]^T$
   $V\_3 = [0\ 0\ 1\ 0]^T$
   $V\_4 = [0\ 0\ 0\ 1]^T$.

3. The method of claim 1, further comprising dividing the subcarriers of the at least one transmit signal into groups of subcarriers, and allocating power for groups of subcarriers to a corresponding one of the plurality of transmitters.

4. The method of claim 3, wherein allocating comprises applying a precoding matrix V_k for subcarrier k, where V_k=
   $V\_(1:numSc/4) = [1\ 0\ 0\ 0]^T$
   $V\_(numSc/4+1:2*numSc/4) = [0\ 1\ 0\ 0]^T$
   $V\_(2*numSc/4+1:3*numSc/4) = [0\ 0\ 1\ 0]^T$
   $V\_(3*numSc/4+1:numSc) = [0\ 0\ 0\ 1]^T$,
   where numSc is the number of subcarriers of the at least one transmit signal.

5. A method comprising:
   at a wireless communication device having a plurality of transmitters each configured to transmit via a corresponding one of a plurality of antennas:
   dividing subcarriers of M plurality of transmit signals into groups;
   allocating power to the groups of the subcarriers of the M plurality of the transmit signals for simultaneous transmission by the plurality of transmitters based on a number of subcarriers of the M plurality of transmit signals; and
   applying precoding matrices for each subcarrier so that for each subcarrier, only M transmitters are allocated maximum power and no beamforming occurs per subcarrier.

6. The method of claim 5, wherein when M=2 and the number of antennas is four, allocating comprises applying precoding matrices:
   $V\_1 = [[1\ 1\ 0\ 0]^T\ [1\ -1\ 0\ 0]^T]$
   $V\_2 = [[0\ 0\ 1\ 1]^T\ [0\ 0\ 1\ -1]^T]$.

7. An apparatus comprising:
   a plurality of transmitters and a corresponding plurality of antennas; and
   a baseband processor configured to be coupled to the plurality of transmitters, wherein the baseband processor is configured to:
   divide subcarriers of at least one transmit signal into groups;
   allocate power to the groups of the subcarriers of the at least one transmit signal to be weighted across the plurality of transmitters for transmission; and
   apply a precoding matrix for each subcarrier so that for each subcarrier, only one transmitter is allocated a maximum power and no beamforming occurs per subcarrier.

8. The apparatus of claim 7, wherein for four antennas, the baseband processor is configured to apply a precoding matrix V_k for subcarrier k, where for any arbitrary four contiguous subcarriers, V_k=
   $V\_1 = [1\ 0\ 0\ 0]^T$
   $V\_2 = [0\ 1\ 0\ 0]^T$
   $V\_3 = [0\ 0\ 1\ 0]^T$
   $V\_4 = [0\ 0\ 0\ 1]^T$.

9. The apparatus of claim 7, wherein the baseband processor is configured to divide the subcarriers of the at least one transmit signal into groups of subcarriers, and allocate power for groups of subcarriers to a corresponding one of the plurality of transmitters.

10. The apparatus of claim 9, wherein the baseband processor is configured to apply a precoding matrix V_k for subcarrier k, where V_k=
    $V\_(1:numSc/4) = [1\ 0\ 0\ 0]^T$
    $V\_(numSc/4+1:2*numSc/4) = [0\ 1\ 0\ 0]^T$
    $V\_(2*numSc/4+1:3*numSc/4) = [0\ 0\ 1\ 0]^T$
    $V\_(3*numSc/4+1:numSc) = [0\ 0\ 0\ 1]^T$,
    where numSc is the number of subcarriers of the at least one transmit signal.

11. An apparatus comprising:
    a plurality of transmitters and a corresponding plurality of antennas; and
    a baseband processor configured to be coupled to the plurality of transmitters, wherein the baseband processor is configured to:
    divide subcarriers of M plurality of transmit signals into groups;
    allocate power to the groups of the subcarriers of the M plurality of transmit signals for simultaneous transmission by the plurality of transmitters; and
    apply precoding matrices for each subcarrier so that for each subcarrier, only M transmitters are allocated maximum power and no beamforming occurs per subcarrier.

12. The apparatus of claim 11, wherein when M=2 and the number of antennas is 4, the baseband processor is configured to apply the precoding matrices:
    $V\_1 = [[1\ 1\ 0\ 0]^T\ [1\ -1\ 0\ 0]^T]$
    $V\_2 = [[0\ 0\ 1\ 1]^T\ [0\ 0\ 1\ -1]^T]$.

13. One or more non-transitory computer readable storage media encoded with software comprising computer executable instructions and when the software is executed operable to:
    queue at least one transmit signal for transmission, the at least one transmit signal comprising a plurality of subcarriers;
    divide subcarriers of at least one transmit signal into groups; and
    allocate power to the groups of the subcarriers of the at least one transmit signal to be weighted across the plurality of transmitters for transmission; and
    apply a precoding matrix for each subcarrier so that for each subcarrier, only one transmitter is allocated a maximum power and no beamforming occurs per subcarrier.

14. The non-transitory computer readable storage media of claim 13, wherein for four antennas, the instructions operable to allocate comprises instructions operable to apply a precoding matrix $V\_k$ for subcarrier k, where for any arbitrary four contiguous subcarriers, $V\_k=$
   $V\_1=[1\ 0\ 0\ 0]^T$
   $V\_2=[0\ 1\ 0\ 0]^T$
   $V\_3=[0\ 0\ 1\ 0]^T$
   $V\_4=[0\ 0\ 0\ 1]^T$.

15. The non-transitory computer readable storage media of claim 13, further comprising instructions operable to divide the subcarriers of the at least one transmit signal into groups of subcarriers, and wherein the instructions operable to allocate comprises instructions operable to allocate power for groups of subcarriers to a corresponding one of the plurality of transmitters.

16. The non-transitory computer readable storage media of claim 15, wherein the instructions operable to allocate comprises instructions operable to apply a precoding matrix $V\_k$ for subcarrier k, where $V\_k=$
   $V\_(1:numSc/4)=[1\ 0\ 0\ 0]^T$
   $V\_(numSc/4+1:2*numSc/4)=[0\ 1\ 0\ 0]^T$
   $V\_(2*numSc/4+1:3*numSc/4)=[0\ 0\ 1\ 0]^T$
   $V\_(3*numSc/4+1:numSc)=[0\ 0\ 0\ 1]^T$, where numSc is the number of subcarriers of the at least one transmit signal.

17. One or more non-transitory computer readable storage media encoded with software comprising computer executable instructions and when the software is executed operable to:
- queue at least one transmit signal for transmission, the at least one transmit signal comprising a plurality of subcarriers;
- divide subcarriers of M plurality of transmit signals into groups;
- allocate power to the groups of the subcarriers of the M plurality of transmit signals for simultaneous transmission by a plurality of transmitters; and
- apply a precoding matrix for each subcarrier so that for each subcarrier, only M transmitters are allocated maximum power and no beamforming occurs per subcarrier.

18. The non-transitory computer readable storage media of claim 17, wherein when M=2 and the number of antennas is four, the instructions operable to allocate comprise instructions operable to apply precoding matrices:
   $V\_1=[[1\ 1\ 0\ 0]^T\ [1\ -1\ 0\ 0]^T]$
   $V\_2=[[0\ 0\ 1\ 1]^T\ [0\ 0\ 1\ -1]T]$.

\* \* \* \* \*

UNITED STATES PATENT AND TRADEMARK OFFICE
CERTIFICATE OF CORRECTION

PATENT NO. : 9,112,555 B2
APPLICATION NO. : 13/678849
DATED : August 18, 2015
INVENTOR(S) : Matthew A. Silverman et al.

Page 1 of 1

It is certified that error appears in the above-identified patent and that said Letters Patent is hereby corrected as shown below:

IN THE CLAIMS
In Column 7, line 27, change "V_4 = [0 0 0 1]T" to --V_4 = $[0\ 0\ 0\ 1]^T$--
In Column 7, line 59, change "V_2 = [[0 0 1 1]T [0 0 1 -1]T]" to --V_2 = $[[0\ 0\ 1\ 1]T\ [0\ 0\ 1\ -1]^T]$--
In Column 8, line 49, change "V_2 = [[0 0 1 1]T [0 0 1 -1]T]" to --V_2 = $[[0\ 0\ 1\ 1]T\ [0\ 0\ 1\ -1]^T]$--
In Column 10, line 23, change "V_2 = [[0 0 1 1]T [0 0 1 -1]T]" to --V_2 = $[[0\ 0\ 1\ 1]T\ [0\ 0\ 1\ -1]^T]$--

Signed and Sealed this
First Day of March, 2016

Michelle K. Lee
*Director of the United States Patent and Trademark Office*